US009515991B2

(12) United States Patent
Curtis et al.

(10) Patent No.: US 9,515,991 B2
(45) Date of Patent: *Dec. 6, 2016

(54) MANAGING AUTHENTICATION REQUESTS WHEN ACCESSING NETWORKS

(71) Applicant: International Business Machines Corporation, Armonk, NY (US)

(72) Inventors: Richard S. Curtis, Fort Collins, CO (US); Jason D. Forrester, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,713

(22) Filed: Feb. 1, 2016

(65) Prior Publication Data

US 2016/0149859 A1    May 26, 2016

Related U.S. Application Data

(63) Continuation of application No. 11/441,949, filed on May 25, 2006, now Pat. No. 9,253,151.

(51) Int. Cl.
*H04L 29/06* (2006.01)

(52) U.S. Cl.
CPC ....... *H04L 63/0209* (2013.01); *H04L 63/0227* (2013.01); *H04L 63/083* (2013.01); *H04L 63/0884* (2013.01); *H04L 63/10* (2013.01)

(58) Field of Classification Search
CPC .. H04L 63/0209; H04L 63/0884; H04L 63/10; H04L 63/083; H04L 63/0227

(Continued)

(56) References Cited

U.S. PATENT DOCUMENTS 6,393,484 B1    5/2002    Massarani
6,438,612 B1    8/2002    Ylonene et al.
(Continued)

FOREIGN PATENT DOCUMENTS

JP    2004312408 A    11/2004

OTHER PUBLICATIONS

"Multiple platforms bring multiple challenges," Communications News, Oct. 2001, vol. 38, No. 10, p. 56. http://www.thefreelibrary.com/Multiple+platforms+bring+multiple+challenges.-a079370488.

(Continued)

*Primary Examiner* — John B King
(74) *Attorney, Agent, or Firm* — Yee & Associates, P.C.; Lisa J. Ulrich

(57) ABSTRACT

Techniques for managing authentication requests. At a gateway device to a network, packets of a message intended for said network are received. Fields within payloads of the packets which contain authentication or authorization information are read. The message is redirected to an authentication server. The authentication server determines that a requester who sent the message to the gateway device is authorized to access a target resource specified in the message and responds to the gateway device that the requester is authorized to access the target resource. The gateway device responds to the requester that the requester is authorized to access the target resource. The gateway device notifies a server hosting the target resource that the requester is authorized to access the target resource. If the gateway device receives a subsequent message from the requester to utilize the target resource, the gateway device forwards the message toward the server.

21 Claims, 3 Drawing Sheets

(58) Field of Classification Search
USPC .............................................. 726/2–5, 8, 21
See application file for complete search history.

(56) References Cited

U.S. PATENT DOCUMENTS

| | | |
|---|---|---|
| 6,912,567 B1 | 6/2005 | Allard et al. |
| 9,253,151 B2 | 2/2016 | Curtis et al. |
| 2002/0042883 A1 | 4/2002 | Roux et al. |
| 2002/0048269 A1 | 4/2002 | Hong et al. |
| 2002/0157007 A1 | 10/2002 | Sashihara |
| 2002/0157019 A1 | 10/2002 | Kadyk et al. |
| 2003/0055990 A1 | 3/2003 | Cheline et al. |
| 2003/0233332 A1 | 12/2003 | Keeler et al. |
| 2004/0123144 A1 | 6/2004 | Chan et al. |
| 2004/0199795 A1 | 10/2004 | Grewal et al. |
| 2004/0255154 A1 | 12/2004 | Kwan et al. |
| 2005/0021975 A1 | 1/2005 | Liu |
| 2005/0044377 A1 | 2/2005 | Huang |
| 2005/0050226 A1 | 3/2005 | Larson |
| 2005/0071667 A1 | 3/2005 | Dankovich et al. |
| 2006/0048212 A1 | 3/2006 | Tsuruoka et al. |
| 2007/0277228 A1 | 11/2007 | Curtis et al. |
| 2008/0163337 A1 | 7/2008 | Tuliani et al. |

OTHER PUBLICATIONS

Syme et al., "Understanding Layer 2, 3 and 4 Protocols," Jul. 2003, Prentice Hall PTR, 6 pages.
Tanenbaum, "1.2.5. Internetworks," Computer Networks (Third Edition), 1996, Prentice Hall PTR, 1 page.
Office Action, dated Oct. 15, 2009, regarding U.S. Appl. No. 11/441,949, 14 pages.
Office Action, dated Apr. 1, 2010, regarding U.S. Appl. No. 11/441,949, 9 page.
Final Office Action, dated Oct. 21, 2010, regarding U.S. Appl. No. 11/441,949, 11 pages.
Office Action, dated Jun. 8, 2011, regarding U.S. Appl. No. 11/441,949, 12 pages.
Office Action, dated Mar. 20, 2012, regarding U.S. Appl. No. 11/441,949, 12 pages.
Notice of Allowance, dated Sep. 23, 2015, regarding U.S. Appl. No. 11/441,949, 16 pages.

MANAGING AUTHENTICATION REQUESTS WHEN ACCESSING NETWORKS

CROSS-REFERENCE TO RELATED APPLICATION(S)

This application is a continuation of and claims the benefit of priority to U.S. patent application Ser. No. 11/441,949, filed on May 25, 2006, the entire contents of which are incorporated herein by reference.

FIELD OF THE INVENTION

The present invention relates generally to computer networks and routing, and more specifically to gaining access to networks.

BACKGROUND OF THE INVENTION

Computer networks are well known today and comprise communication media, and routers, network switches, firewalls, authentication servers, Internet service providers, and/or load balancers. Examples of computer networks are Local Area Networks, Wide Area Networks, Intranets, the Internet, extranets, LAN, WAN, and Metro Polotan Networks. The networks interconnect client computers and server computers. The following network arrangement was known. A client computer is connected via the Internet to a network switch at a gateway to a target network. The network switch performs Network Level (or Layer) 2 switching. Network Level 2 switching is a technology that alleviates congestion in Ethernet, Token Ring and LANs (OSI layer 2) by reducing traffic and increasing bandwidth. Such switches, known as LAN switches, are designed to work with existing cable infrastructures so that they can be installed with minimal disruption of existing networks. The most common LAN media is traditional Ethernet which has a maximum bandwidth of 10 Mbps and is a half-duplex technology. Each Ethernet host checks the network to determine whether data is being transmitted before it transmits and defers transmission if the network is in use. In spite of this transmission "deferral", two or more Ethernet hosts can transmit at the same time, which results in a collision. When a collision occurs, the hosts enter a back-off phase and retransmit later. As more hosts are added to the network, hosts must wait more often before they can begin transmitting, and collisions are more likely to occur because more hosts are trying to transmit. Today, throughput on traditional Ethernet LANs suffers even more because users are running network-intensive software, such as client-server applications, which cause hosts to transmit more often and for longer periods of time. There may be a firewall between the network switch and the target network. One or more servers are connected to the target network to provide resources (such as files, applications and services) to the client computer.

To access the resources, the user or client computer must get authenticated from an authentication function. The authentication function can reside in the target server or in a separate, authentication repository. In the latter case, one or more authentication servers can be coupled to the target network to control access to the target network. There can be one authentication server to authenticate a user of the client computer, and another authentication server to authenticate the client computer in the event there are two types of authentication that may be needed. To request logon or authentication to a resource or service in the target network, the user or client computer sends authentication or authorization information, such as a UserID and password or certificate, to the target network in a message. This message is a specific request for authentication or authorization to access the target network and includes the authentication or authorization information in the payload of the message. In the case of a request for authentication to a Windows resource, the header of the message also indicates that the message is an authentication request. Typically, the client computer parses the message into packets for network transmission. When the network switch receives message packets, it forwards them to the address indicated in the header, i.e. the target network, except if the message packet header indicates the message is an authentication request intended for a separate authentication server for the target network which is addressed. In the former case, where the message packet header does not indicate the message is an authentication request, the network switch passes the message to the firewall. The firewall then applies its security policy, and if the message complies with the security policy, the firewall forwards the message to the target server on the target network. Then, the target server attempts to authenticate the requester, and if authentic, sends a response back to the requester that the requester is authorized to access the target application. The target server keeps a record that the requester is authorized to access the target application, and the requester can send other messages requesting usage of the target application. In the latter case, where the header of the authentication request indicates that the request is for authentication, the network switch forwards the authentication request to one of the separate authentication servers. In response, the separate authentication server attempts to authenticate the requester, and if authentic, sends a response back to the requester that the requester is authorized to access the target application and also notifies the target server that the requester is authorized to access the target application. The target server keeps a record that the requester is authorized to access the target application, and the requester can send other messages requesting usage of the target application.

While the foregoing process is effective, it may require authentication functions at two or more servers.

An object of the present invention is to consolidate authentication in a single authentication function, for access to a target resource on a remote network.

SUMMARY OF THE INVENTION

The present invention resides in a computer system, method and program for managing authentication requests. At a gateway device to a network, packets of a message intended for said network are received. In response, fields within payloads of said packets which contain authentication or authorization information are read. In response, the message is redirected to an authentication server.

In accordance with features of the present invention, in response to receipt of the redirected message from the gateway device, the authentication server determines that a requester who sent the message to the gateway device is authorized to access a target resource specified in the message and responds to the gateway device that the requester is authorized to access the target resource. In response, the gateway device responds to the requester that the requester is authorized to access the target resource. In response to the response from the authentication server that the requester is authorized to access the target resource, the gateway device notifies a server hosting the target resource that the requester is authorized to access the target resource. If the gateway device receives a subsequent message from the requester to utilize the target resource, the gateway device forwards the message toward the server hosting the target resource.

DETAILED DESCRIPTION OF THE PREFERRED EMBODIMENTS

Figure 1:
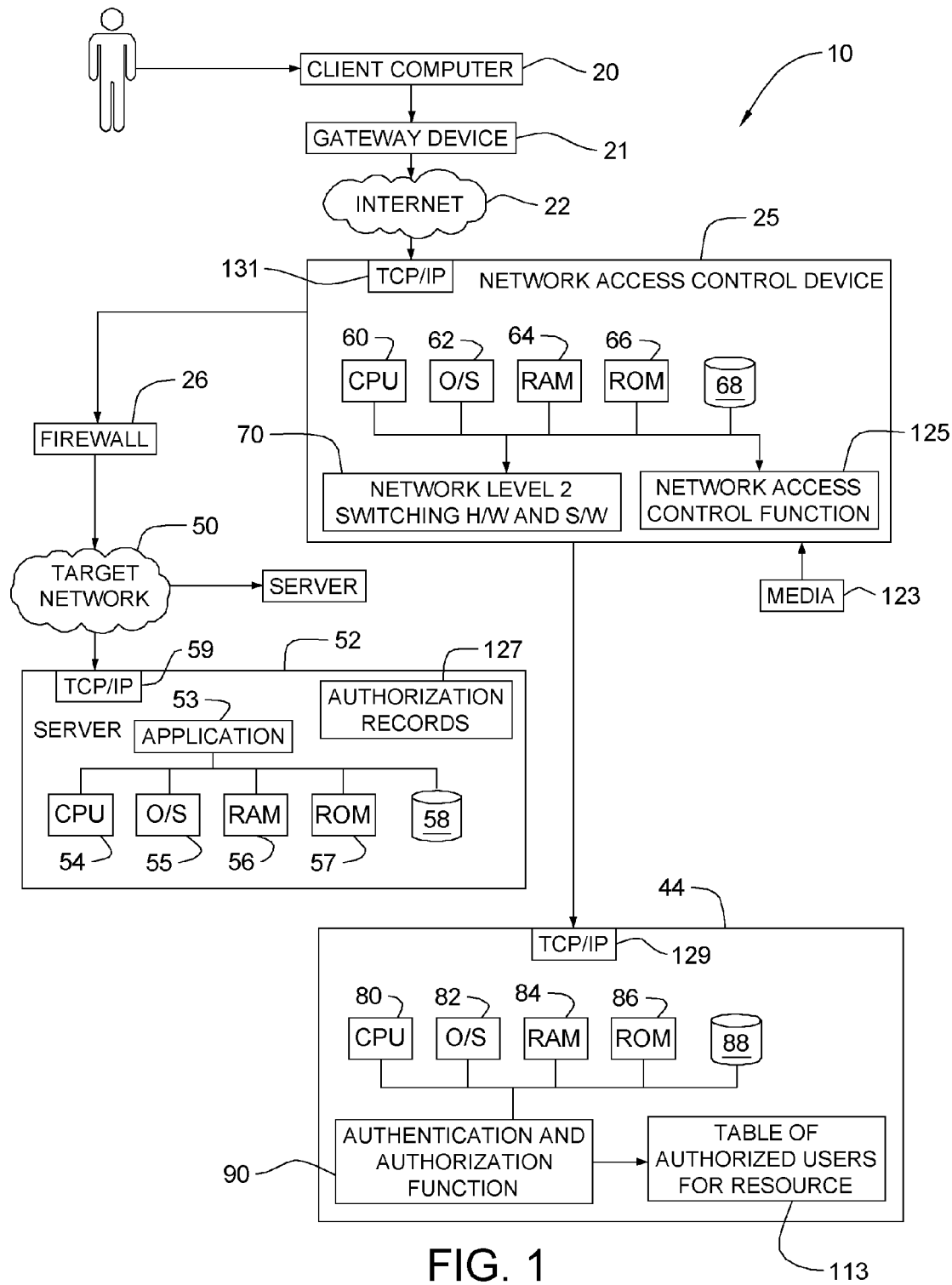
FIG. 1 is a block diagram of a distributed computer system, including a network access control device, such as an improved network switch, improved router or improved firewall, and a consolidated authentication server, in which the present invention is incorporated.

The present invention will now be described in detail with reference to the figures. FIG. 1 illustrates a distributed computer system generally designated 10, in which the present invention is incorporated. Distributed computer system 10 comprises an intermediary network 22 such as the Internet, Intranet, LAN or WAN, and the following devices coupled to intermediary network 22. A client computer 20 is coupled via a gateway device 21 to network 22. A network access control device 25 such as an improved network switch, improved router or improved firewall modified according to the present invention is connected to network 22. Network access control device 25 can be a Network Level 2 device that performs network switching, and optionally, other functions such as routing and/or firewall protection. Network access control device 25 is preferably located at a gateway to target network 50, such that message packets addressed to target network 50 arrive at network access control device 25 before reaching target network 50. An optional firewall 26 is connected to network access control device 25 "behind" the network access control device 25 such that network access control device 25 controls access of messages from intermediary network 22 to firewall 26. A target network 50 is connected to firewall 26 "behind" firewall 26 such that firewall 26 controls access of messages from network access control device 25 into target network 50 according to a security policy. If firewall 26 is not included in system 10, then target network 50 is connected to network access control device 25. One or more servers such as application server 52 are connected to target network 50 to provide resources to client computers such as client computer 20. The resources can be files, servers and applications. Server 52 includes a CPU 54, operating system 55, RAM 56, ROM 57, storage 58 and TCP/IP adapter card 59.

A consolidated authentication server 44 is connected to network access control device 25 to provide authentication services for access to network 50 and server 52. Consolidated authentication (and authorization) server 44 determines if requesters are authorized to access a target resource such as server 52. Consolidated authentication server 44 comprises a CPU 80, operating system 82, RAM 84, ROM 86, and storage 88, according to the prior art. Consolidated authentication server 44 also includes an authentication and authorization function 90 which provides a known authentication function, except that in the preferred embodiment of the present invention, consolidated authentication server 44 is programmed to return the results of its authentication function to network access control device 25.

Network access control device 25 comprises a CPU 60, operating system 62, RAM 64, ROM 66, storage 68 and Network Level 2 switching hardware and software component 70, according to the prior art. Network Level 2 component 70 conforms to the seven layer Open Systems Interconnection model. The Network Level 2 layer, also known as Data Link Layer, defines lower level addressing structure to be used between end devices. Examples of devices which implement Network Level 2 protocols are Ethernet, Token Ring and Frame Relay.

Network access control device 25 performs the general functions of Network Level 2 switching, and optionally routing of messages, or enforcing a security policy of the target network depending on whether it also serves as a network router or firewall, respectively. (If network access control device 25 includes a firewall function, then firewall 26 can be omitted.) Network access control device 25 also includes a network access control function 125 according to the present invention.

Network access control function 125 can be implemented in hardware and/or software. Network access control function 125 identifies authentication requests for resources on network 50 and redirects them to consolidated authentication server 44, as follows. A requester, for example, client computer 20 or a user at client computer 20 sends an authentication or authorization request to access a target resource such as an application 53 on application server 52 on target network 50. The request is addressed to the network gateway, such as network access control device 25, for the target network and also identifies the target resource, for example, application 53. For example, the request can be addressed with a URL, corresponding to an IP address of the target network 50, with a suffix at the end of the URL identifying the target resource. The authentication request includes, in its payload, authentication information such as UserID and password or just authorization information such as UserID (in the case of unprotected resources). The authentication request includes a header which may or may not indicate that the request is an authentication request. The authentication request is packetized and sent via intermediary network 22 to network access control device 25.

If the message header identifies the message as an authentication message, network access control device 25 identifies this message as an authorization request based on the header, and redirects the message to consolidated authentication server 44. However, if the message header does not identify the message as an authentication message, network access control device looks inside the payload of the message to determine whether the message is an authentication message, and if so, redirects the message to consolidated authentication server 44, as follows. Based on "standards" for the protocol and format of the message packets such as phrase, specific command functions, UserID in the payload, or a specific application authentication request, network access control device 25 reads the fields within the message packets that should contain authentication or authorization information if the message is an authentication request. For example, such fields are user name, password, group identification. If network access control device 25 finds authentication or authorization information in these fields, then network access control device 25 determines that the message is an authentication request, and redirects these message packets to consolidated authentication server 44. Consolidated authentication server 44 also knows, based on the "standards" for protocol and format of the message packets, where the authentication or authorization information should be located in the message packets. Next, consolidated authentication server 44 determines if the requester is authorized to access the target resource based on the authentication or authorization information in the message. If not, consolidated authentication server 44 responds to the network access control device 25 that access is not granted, and network access control device 25 responds to the requester (client 20) that authorization to access the target resource is denied. However, if the requester is authentic and authorized to access the target resource, consolidated authentication server 44 responds to the network access control device 25 that authorization to access the target resource is granted, and network access control device 25 responds to the requester that authorization to access the target resource is granted. Consolidated authentication server 44 also sends a message to the target server 52 and target application 53 that the requester is authorized to access the target resource, and the target server keeps a record of this authorization. This authorization will remain valid until the requester accesses another restricted resource or discontinues the session.

After receiving the response that authorization has been granted to the target resource, the requester can send other messages to the target resource requesting actual use of the target resource. Network access control device 25 will determine that these subsequent messages are not authentication requests, either based on the header or contents of the payload as described above, and pass these subsequent messages, which request actual use of the target resource, to firewall 26 (or to target network 50 in the absence of firewall 26). Assuming these messages comply with the security policy enforced by firewall 26 for target network 50, firewall 26 will forward these subsequent messages to the target server 52. In response, the target server 52 will check its record to determine if the requester is still authorized, and if so, forward these messages to the target resource 53 for processing. The target resource 53 will process the message request, and return an appropriate response (such as requested data or web page) to the requester 20, via network 50, firewall 26, network access control device 25, intermediary network 22 and gateway 21.

Figure 2A:
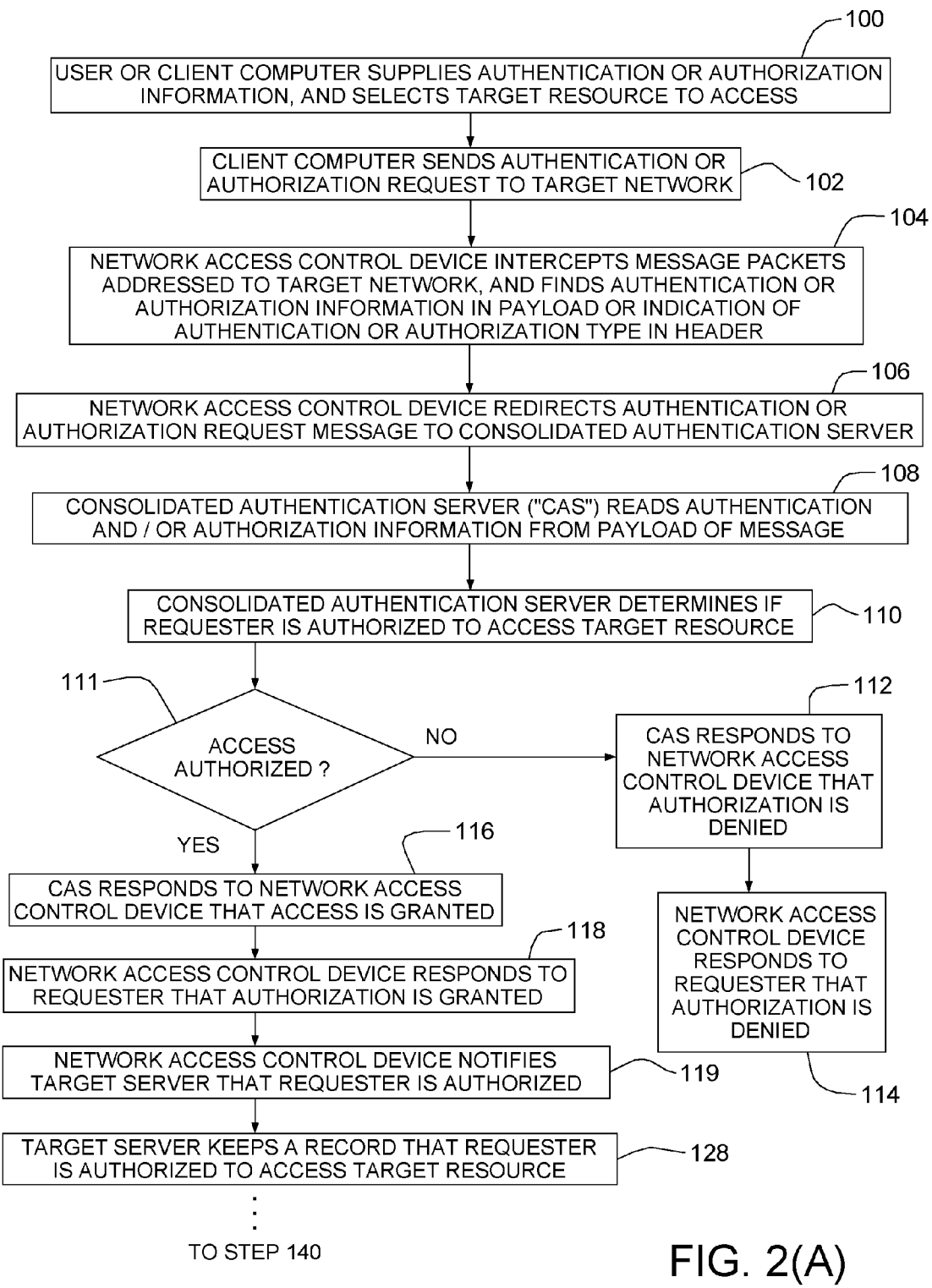
FIGS. 2(A) and 2(B) form a flowchart of processing by the network access control device and consolidated authentication server of FIG. 1.
Figure 2B:
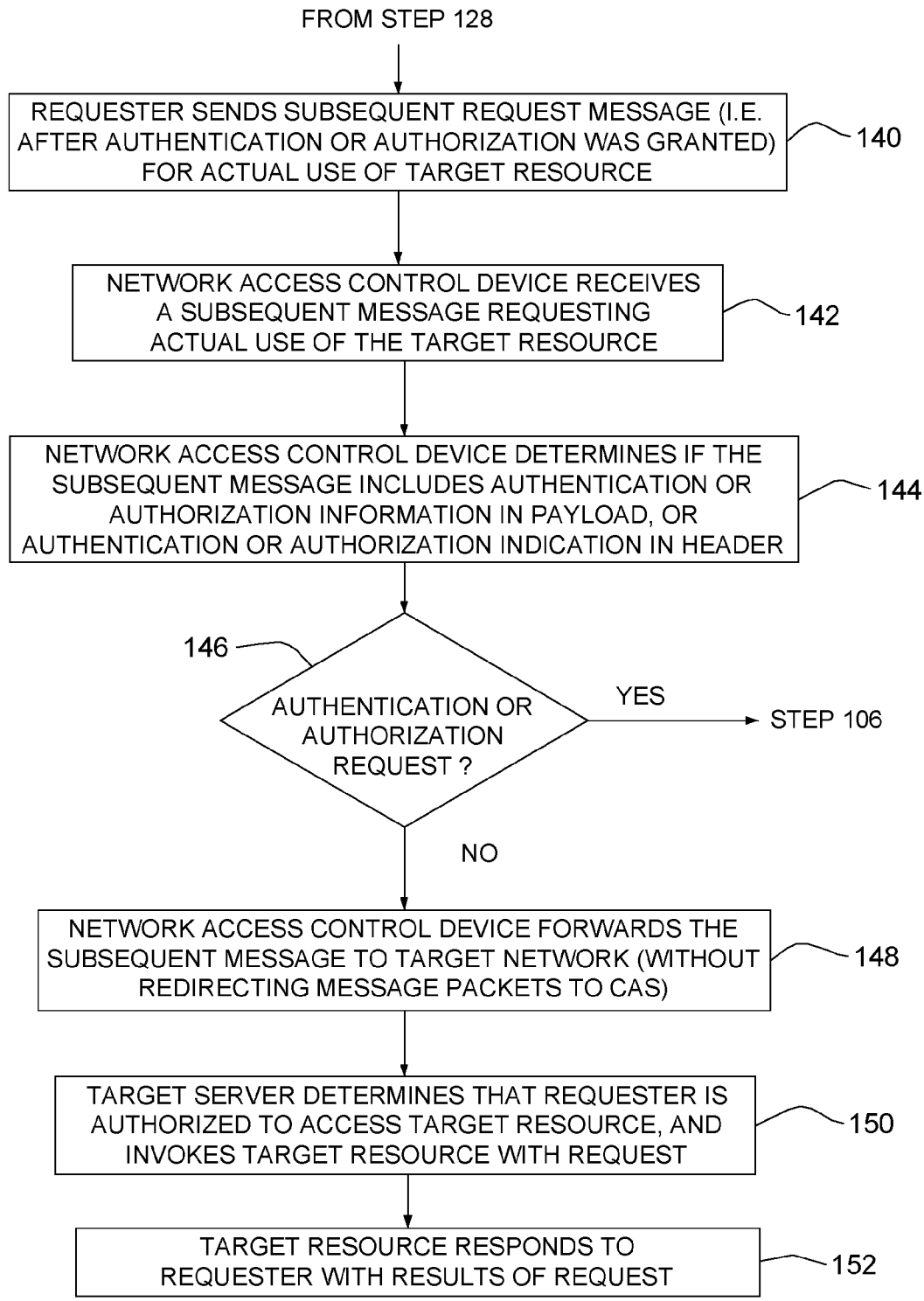

FIGS. 2(A) and 2(B) and the following provide a more detailed description of the foregoing process. In step 100, the requester, i.e. a client computer 20 or a user at the client computer 20, attempts to logon to a target resource or otherwise obtain authorization to access the target resource. In the illustrated example, target server 52 on target network 50 hosts the target resource such as application 53. The target resource can alternately be files, servers, or other applications. In the case of a request to logon or authenticate to a protected target resource, the logon request typically includes a UserID and password of the requester (step 102). In the case of a request for authorization to access an unprotected target resource, the authorization request may include a UserID, phrase, specific command functions, UserID in the payload, or a specific application authentication request. The authentication or authorization request is formed into a message according to the protocol used for the request, such as Internet Protocol, TCP, UDP, SNA or SMB protocol. The protocol implements a respective "standard", and the standard specifies the types and locations of the fields of the message including the header(s) and payload, and also the different fields within the header(s) and payload. The header(s) typically includes addressing information such as the IP address of the target network and identification of target application. Some of the fields in the payload are used for the authentication or authorization information, and other fields are used for the type of request and other data. As noted above, some types of messages, such as Microsoft Windows Login (SMB Login) message, also include in the header an indication whether a message is an authentication request. In any event, the authentication request message is addressed and sent to the target network 50 (step 102), and arrives at the network access control device 25 (step 104).

In step 104, network access control device 25 (at the entrance of target network 50) receives the message packets from the requester and identifies those message packets containing authentication and authorization information. As noted above, some of the protocols specify that the message packets include a header which indicates that the message is an authentication request. For these types of message packets, network access control device identifies the message as an authentication request based on the header. However, most protocols do not include such an identification in the message packet header. For those message packets which do not include an identification in the message packet header, network access control device 25 identifies the message packets containing authentication and authorization information based on the content of the payload. The "standard" for the form of the message specifies the fields within the message packet containing the authentication or authorization information for authentication requests. For example, the standard for an SMB protocol message packet, specifies the following format:

NBT: DS: Type=17 (DIRECT GROUP) SMB: C transact, File=\MAILSLOT\NET\NTLOGON
NETLOGON: SAM LOGON request from client where the NTLLOGON NETLOGON: SAM LOGON field in the payload is for the authentication information. Thus, the authentication or authorization information is contained in the payload, not the header, of this type of message packet.

In step 106, network access control device 25 redirects these message packets for authentication requests to consolidated authentication server 44. In step 108, consolidated authentication server 44 reads the contents of the payload to extract the authentication and authorization information such as UserID and password. In step 110, consolidated authentication server 44 determines if access to the requested resource is permitted based on a comparison of the authentication and/or authorization information extracted from the message packet(s) to a table 113 within consolidated authentication server 44 which lists the valid combinations of UserID and password for accessing the target resource. If the consolidated authentication server 44 denies access to the target resource (decision 111, no branch) then server 44 replies to network access control device 25 that access to the target resource is denied (step 112). In response, network access control device 25 responds to the requester that access to the target resource is denied (step 114). However, if the consolidated authentication server 44 grants access to the target resource (decision 111, yes branch) then server 44 replies to network access control device 25 that access to the target resource is granted (step 116). In response, network access control device 25 responds to requester that access to the target resource has been granted (step 118). Also, network access control device 25 sends a message to the target server 50 via firewall 26 that the requester is authorized to access the target resource (step 119). Firewall 26 applies the security policy of the target network 50 based on source IP address, destination IP address, source port, destination port, etc. to determine whether to allow the request to pass through the firewall to target network 50. If firewall 26 blocks the message, then the message is discarded. Typically this message will pass through the firewall 26, and proceed to the target server 52 on target network 50. Target server 52 keeps a record 127 of the authorization of the requester to access the target resource (step 128). The authorization last until the requester accesses another restricted resource or discontinues the session. (In the former case where the requester supplies valid authentication information to access the other restricted resource, network access control device 25 will recognize the request as an authentication request and forward the request to consolidated authentication server 44. Consolidated authentication server 44 will notify network access control device 25 that access to this other resource is granted. In response, network access control device 25 will notify the requester that access to the other resource is granted, and notify target server 52 to terminate the prior authentication of the requester for access to target resource 53. In the latter case, when the requester terminates the session with target resource 53, then target server 52 will terminate the authentication of the requester to access target resource 53.)

In the case where authorization is granted to access the target resource, the requester can proceed to make subsequent requests for actual use of the target resource such as to use the application to obtain a service or data (step 140). Such requests are addressed to the target network 50 and identify the target resource and sender. Such requests are also received by network access control device 25 before reaching target network 50 (step 142). Network access control device determines if the header indicates that the message is a request for authentication or authorization, and if there is no header of this type, checks the payload to determine if the message includes authentication or authorization information (step 144). In this case, the message is not a request for authentication or authorization, but a request to actually use the requested resource (decision 146, no branch), so network access control device 125 forwards the message to the target server via firewall 26 (step 148). In response, the target server determines that the requester is authorized to access the target resource based on the previous notification from the network access control device 25 in step 119, and the record kept at the target server (step 150). Consequently, target server 152 invokes the requested resource to handle the request and respond to the requester with the results (step 152).

Network access control function 125 can be loaded into network access control device 25 from a computer readable media 123, such as magnetic tape or disk, optical media, DVD, memory stick, etc. or downloaded from the Internet via TCP/IP adapter card 131.

Authentication and authorization function 90 can be loaded into consolidated authentication and authorization server 44 from a computer readable media 133, such as magnetic tape or disk, optical media, DVD, memory stick, etc. or downloaded from the Internet via TCP/IP adapter card 129.

Based on the foregoing, a system, method and program for consolidating authentication in a single authentication function have been disclosed. However, numerous modifications and substitutions can be made without deviating from the scope of the present invention. For example, authentication and authorization function 90 can make authorization decisions based on policy. Therefore, the present invention has been disclosed by way of illustration and not limitation, and reference should be made to the following claims to determine the scope of the present invention.

What is claimed:

1. A method for managing authentication requests, said method comprising the steps of:
 a gateway device of a network receiving packets of a first message intended for a target server of the network, and in response, the gateway device reading one or more fields within a payload of one of the packets which contains authentication information for a sender of the first message without reading an indication of authentication information in headers of the packets, and in response, the gateway device redirecting the first message to an authentication server to authenticate the sender;
 the gateway device receiving other packets of a second message intended for the target server of the network, the other packets having headers which identify the second message as an authentication request, and in response, the gateway device redirecting the second message to the authentication server; and
 in response to receiving a response from the authentication server that the sender of the first message or the second message is authorized to access a target resource specified in either the first message or the second message, the gateway device responding to the sender that the sender is authorized to access the target resource and notifying the target server that the sender is authorized to access the target resource.

2. The method as set forth in claim 1 further comprising the steps of:
 in response to receipt of the redirected first message from the gateway device, the authentication server determining that the sender of the first message intended for the target server is authorized to access the target resource specified in the first message intended for the target server and responding to the gateway device that the sender is authorized to access the target resource.

3. The method as set forth in claim 1 further comprising steps of:
 the gateway device receiving a subsequent message from the sender to utilize the target resource, and in response, the gateway device forwarding the subsequent message toward the target server hosting the target resource.

4. The method as set forth in claim 1 wherein the step of redirecting the first message intended for the target server further comprises the step of the gateway device implementing Level 2 switching of the first message.

5. The method as set forth in claim 1 wherein the packets of the first message intended for said network the target server include a header, but the header does not include any indication that the first message intended for the target server is a request for authentication or authorization.

6. The method as set forth in claim 1, wherein the step of redirecting the second message to the authentication server is performed without reading fields within payloads of the other packets which contain authentication or authorization information.

7. The method as set forth in claim 1 wherein the authentication information comprises a password.

8. A system for managing authentication requests, said system comprising:
 a gateway device to a network, the gateway device including a central processing unit (CPU), a computer readable memory, and a computer readable tangible storage device;
 first program instructions to receive packets of a first message intended for a target server of the network, and in response, to read one or more fields within a payload of one of the packets which contains authentication information for a sender of the first message without reading an indication of authentication information in headers of the packets;

second program instructions, responsive to the fields containing authentication information, to redirect the first message by the gateway device to an authentication server to authenticate the sender;

third program instructions to receive other packets of a second message intended for the target server of the network, the other packets having headers which identify the second message as an authentication request, and in response, to redirect the second message to the authentication server; and fourth program instructions, responsive to receiving a response from the authentication server that the sender of the first message or the second message is authorized to access a target resource specified in either the first message or the second message, to respond to the sender that the sender is authorized to access the target resource and to notify the target server that the sender is authorized to access the target resource; and wherein the first program instructions, the second program instructions, the third program instructions and the fourth program instructions are stored on the computer readable tangible storage device for execution by the CPU via the computer readable memory.

9. The system as set forth in claim 8 further comprising:
the authentication server including a second CPU, a second computer readable memory and a second computer readable tangible storage device;

fifth program instructions, responsive to receipt of the redirected first message from the gateway device, to determine that the sender who sent the first message intended for the target server is authorized to access the target resource specified in the first message intended for the target server and respond to the gateway device that the sender is authorized to access the target resource;

and wherein the fifth program instructions are stored on the second computer readable tangible storage device for execution by the second CPU via the second computer readable memory.

10. The system as set forth in claim 8 further comprising:
fifth program instructions to receive a subsequent message from the sender to utilize the target resource, and in response, forward the subsequent message toward the target server hosting the target resource; and wherein the fifth program instructions are stored on the computer readable tangible storage device for execution by the CPU via the computer readable memory.

11. The system as set forth in claim 8 wherein the second program instructions to redirect the first message intended for the target server further comprises program instructions to implement Level 2 switching of the first message.

12. The system as set forth in claim 8 wherein the packets of the first message intended for the target server include a header, but the header does not include any indication that the first message intended for the target server is a request for authentication.

13. The system as set forth in claim 8, wherein the third program instructions to redirect the second message to the authentication server is performed without reading fields within payloads of the other packets which contain authentication information.

14. The system as set forth in claim 8 wherein the authentication information comprises a password.

15. A computer program product for managing authentication requests, said computer program product comprising:
a non-transitory computer readable tangible storage device;

first program instructions for execution within a gateway device of a network, to receive packets of a first message intended for a target server of the network by the gateway device, and in response, read one or more fields within a payload of one of the packets which contains authentication information for a sender of the first message without reading an indication of authentication information in headers of the packets;

second program instructions for execution within said gateway device, responsive to the fields containing authentication information, to redirect the first message by the gateway device to an authentication server to authenticate the sender;

third program instructions for execution within the gateway device to receive other packets of a second message intended for the target server of the network, the other packets having headers which identify the second message as an authentication request, and in response, redirect the second message to the authentication server; and fourth program instructions for execution within the gateway device responsive to receiving a response from the authentication server that the sender of the first message or the second message is authorized to access a target resource specified in either the first message or the second message, to respond to the sender that the sender is authorized to access the target resource and to notify the target server that the sender is authorized to access the target resource; and wherein the first program instructions, the second program instructions, the third program instructions and the fourth program instructions are stored on the non-transitory computer readable tangible storage device.

16. The computer program product as set forth in claim 15 further comprising:
a second computer readable tangible storage device;
fifth program instructions for execution within the authentication server responsive to receipt of the redirected first message from the gateway device, to determine that the sender who sent the first message intended for the target server is authorized to access the target resource specified in the first message intended for the target server and respond to the gateway device that the sender is authorized to access the target resource; and wherein the fifth program instructions are stored on the second computer readable tangible storage device.

17. The computer program product as set forth in claim 15 further comprising:
fifth program instructions for execution within the gateway device, to receive a subsequent message from the sender to utilize the target resource, and in response, forward the subsequent message toward the target server hosting the target resource; and wherein the fifth program instructions are stored on the computer readable tangible storage device.

18. The computer program product as set forth in claim 15 wherein the second program instructions to redirect the first message intended for the target server to the authentication server for implementing Level 2 switching of the first message.

19. The computer program product as set forth in claim 15 wherein the packets of the first message intended for the target server include a header, but the header does not include any indication that the first message intended for the target server is a request for authentication.

20. The computer program product as set forth in claim 15, wherein the third program instructions to redirect the second message to the authentication server is performed without reading fields within payloads of the other packets which contain authentication information.

21. The computer program product as set forth in claim 15 wherein the authentication information comprises a password.

* * * * *